United States Patent

Häusler et al.

[11] 4,173,780
[45] Nov. 6, 1979

[54] METHOD AND APPARATUS FOR CONTROLLING THE REAL AND REACTIVE POWER BEHAVIOR OF A HIGH VOLTAGE D.C. TRANSMISSION (HDT) SYSTEM

[75] Inventors: Michael Häusler, Hirschberg; Karl-Werner Kanngiesser, Viernheim, both of Fed. Rep. of Germany

[73] Assignee: BBC Brown Boveri & Company Limited, Baden, Switzerland

[21] Appl. No.: 872,628

[22] Filed: Jan. 26, 1978

[30] Foreign Application Priority Data

Feb. 9, 1977 [DE] Fed. Rep. of Germany ....... 2705242

[51] Int. Cl.² .......................... H02H 7/00; H02J 3/36
[52] U.S. Cl. ........................................ 363/51; 363/35
[58] Field of Search ........................... 363/35, 50–51, 363/34, 37, 54, 57–58; 361/88, 91, 93, 111

[56] References Cited

U.S. PATENT DOCUMENTS

| | | | |
|---|---|---|---|
| 3,766,465 | 10/1973 | Reeve | 363/51 X |
| 3,801,895 | 4/1974 | Kanngiesser | 363/51 X |
| 3,883,790 | 5/1975 | Hammarlund et al. | 363/35 |
| 3,968,419 | 7/1976 | Ekstrom | 363/51 X |

*Primary Examiner*—William M. Shoop
*Assistant Examiner*—Peter S. Wong
*Attorney, Agent, or Firm*—Oblon, Fisher, Spivak, McClelland & Maier

[57] ABSTRACT

A method and apparatus for controlling the real and reactive power behavior of a high voltage transmission (HDT) system characterized by a rectifier station connected to a first three phase network and an inverter station connected to a second three phase network. The rectifier and inverter stations have positive and negative station-halves connected to each other over positive and negative D.C. transmission lines to form positive and negative poles, each station having a common ground or return wire. Each station is equipped with current and voltage regulators, as well as control angle and quenching angle regulators whereby in case of the tripping of line protective devices monitoring line current in a faulty pole, and the consequent unloading of the faulty pole, the regulation of the intact pole assumes control for a short time to protect against network transients resulting from the load drop. In the event of a line disturbance, both the current set point for the current regulator and the control angle set point for the control angle regulator of the intact station-half of the intact pole are increased according to preset functions, with the control angle set point subordinated to the magnitude of the current angle set point.

13 Claims, 5 Drawing Figures

METHOD AND APPARATUS FOR CONTROLLING THE REAL AND REACTIVE POWER BEHAVIOR OF A HIGH VOLTAGE D.C. TRANSMISSION (HDT) SYSTEM

BACKGROUND OF THE INVENTION

1. Field of the Invention

The invention relates to a method and apparatus for controlling the real and reactive power behavior of a high voltage D.C. transmission (HDT) system during a line disturbance, and more particularly, to a method and apparatus for adjusting the current and control angle regulators of an HDT system to protect against system transients and overvoltage occurring after a line disturbance.

2. Description of the Prior Art

In prior HDT systems, after tripping of the transmission line protective devices of one station-half, the faulty station-half is generally cut out for a short time. The resultant load drop causes a voltage rise in the three-phase driving network or the rectifier transformer, which endangers the rectifier station connected to the transformer, and in particular the controllable rectifier valves.

This problem is solved by a known method in which, in case attempts to get the faulty pole back on line fail, the regulation of the intact station-halves is timely adjusted in amplitude and phase for the purpose of preventing overvoltage in the driving three-phase network. In particular, in the known method the control angle in the intact rectifier station is increased constantly to a maximum value of about 60° to 70° in about 10 to 25 ms from the onset of the fault (DT-OS No. 2,418,468). The control of the intact rectifier and the inverter station halves by varying of the control angle of the rectifier station-half and the current set-points of the rectifier and inverter station-halves during a momentary fault must correspond to the regulation provided in the normal case. This measure and the maintenance of true power transmission, within the limits of the intact HDT, are not given enough consideration in the known case.

It is further known how to construct an HDT system for the regulation of reactive power or line voltage in addition to the transmission of true power DT-OS No. 1,962,042, U.S. Pat. No. 3,949,291). A disadvantage of this method is a loss in transmission efficiency proportional to the line length. Therefore this regulation method is economical only for short times.

Even though an HDT system of significant transmission length is not normally used for line voltage regulation, this does not preclude an occasional application in special cases. In particular, an HDT system of the above-mentioned type can be used for controlling line overvoltages as occur, e.g., in connection with an HDT load drop, such that the level of isolation of the HDT can be lowered without great expense, thus leading to savings in rectifier construction.

In a known method, for avoiding the overvoltage occurring during a load drop in an HDT system, as disclosed in DT-OS No. 1,943,646 and U.S. Pat. No. 3,801,895, when a line protective device of a faulty station-half is tripped, the D.C. current of the intact station-half is increased by dropping the voltage at the inverter in such a way that the intact station-half increases its rectifier reactive power to the extent that the intact station-half draws from the three-phase network about the same reactive power as was drawn by both station-halves together before the disturbance. In the event of rapid voltage change at the inverter, the rectifiers, constructed from the thyristors at both the converter and the inverter, can be overloaded by the heavier current flow. The control angle is then so diminished, in order to decrease the voltage at the inverter station, that it is shifted in direction at the rectifier drive, but is held constant at the inverter end. In order, under the assumptions, to hold the reactive power reduction of the HDT constant under the aforesaid fault condition, the D.C. current of the remaining station-halves must be increased by a factor less than 2. The value is not doubled because the commutation reactive power increases not only with the value of the D.C. current but also, and quite sharply, with increase in firing angle. In the known case the determination has of course been made as to whether the remaining current overload of the thyristor valves is safe. Decisive to this determination is the permissible peak value of the forward current as a function of overcurrent duration. Assuming an overcurrent duration about equal to the arc de-ionization time, one derives the permissible peak current from the maximum load curve. The thyristors, if necessary, are so overloaded for a conduction period corresponding to the arc de-ionization time, that the above-mentioned constancy of the reactive power reduction is assumed. Along with this optimization between the utilization of the valves and the reactive power output, there is the further desire to impair the true power transmission as little as possible. The above-mentioned reference, U.S. Pat. No. 3,801,895, gives no indication of how this is to be done.

SUMMARY OF THE INVENTION

Accordingly, one object of this invention is to provide a novel method and apparatus for controlling the true and reactive power behavior of a High-Voltage D.C. transmission (HDT) system.

Another object of this invention is to minimize network synchronous transient overvoltages in the three-phase networks connected to the HDT system when a station half is disconnected at full load from the HDT system.

A further object of this invention is to provide a novel method and apparatus for controlling the true and reactive power behavior of an HDT system whereby fewer valves, or valves having lower inverse voltage ratings are feasible.

Yet another object of this invention is to specify the control characteristic in the regulation of a functioning HDT, wherein the necessary changes of the control variable are to be derived simply from the given quantities.

Another object of this invention is to provide a novel HDT system having regulation controls which permit true power transmission to the limit of the capability and which facilitate restarting of a disturbed pole.

These and other objects of the present invention are achieved by an intervention in the HDT power regulation, as now described.

The intervention can be triggered by a disturbance in the HDT system or by problems in the three-phase network. In either case a voltage rise at the valves is to be prevented or suppressed. The intervention in the regulation required is therefore to last only until the line-voltage regulation or the step-switch regulation of the rectifier transformer which holds the ideal D.C. voltage constant has adjusted to the changed conditions, or until the faulty pole has been returned to service. The aim here is to compensate for the loss of the disturbed HDT pole's true power by intervention in the intact pole's regulation long enough for the network-frequency regulation to follow. Whether and to what extent the reactive and true power variations can be compensated for a limited time by intervention in the HDT regulation naturally depends on the initial loading of the station elements in question, i.e., on the operating conditions just before a fault occurs. It is desirable to make full use of the short-time overload capability of the rectifier valves in such an intervention.

The solution of the regulation problem according to this invention is to change the current set-point for the current regulator of the other intact station-half of the one pole in an increasing direction according to a preset function, and also to likewise change a control angle set-point for the control angle regulator of the one intact station-half of the same pole in an increasing direction according to a preset function. New set-points are calculated from the current set-points of both halves of one station recorded at the instant of the fault, and a predetermined maximum current, whereby after the attainment of the control angle setting limit ($\alpha$ min) in the one intact station-half, first the other intact station-half of the same pole takes over the current regulation and then the control angle increase in the one intact station-half is undertaken.

As in a variation of the known method (DT-OS No. 2,418,468), in case of the tripping of protective devices of one station-half and subsequent load-shedding by this disturbed station-half, the control of the intact rectifier and inverter station-halves is affected in such a way that true power transmission is maintained until the maximum current is reached. Under the assumption that the intact station-half belongs to the normally current regulating or setting rectifier station, it transfers its current regulating function to the other inverter station in case of a fault. In that way the familiar marginal current method (GB-PS No. 1,043,055) is abandoned for the time that the rectifier station does not regulate the current. As soon as the maximum current is reached, the reactive power increases through increases of the rectifier control angle $\alpha$. The adjustment of $\alpha$ can thus be considered as standby control for the reactive power.

Unless the D.C. current is increased under the influence of the inverter, the network voltage cannot be held exactly constant. A combination of increased control angle and constant current results in only slightly less voltage rise than occurs with no intervention in the valve or grid control. This procedure is detrimental in that the power transmission of the intact pole is further diminished instead of restoring lost power as is desired. In order to largely prevent a voltage rise and rather increase the transmitted true power, it is thus more advantageous to order a set-point increase at the intact station-halves at both the rectifier and inverter ends.

If current control is initiated at the rectifier then the current set-point derived from the recorded values must be sent to the intact inverter station-half over a signal wire. Depending on the signal transit time a slight delay in the millisecond range will exist between the orders.

This delay time should be kept as small as possible; however, relay actuation times etc. add to the transit delay ($\approx$20 ms) of the signal.

It is also desired that the current rise be sufficiently rapid, i.e. not so fast that sharp asymmtries arise (cf. FIG. 3 in U.S. Pat. No. 3,801,895), but yet fast enough to reach the final value after about 1 to 2 cycles of A.C.

A partial solution to the time delay problem is to record the current setpoint and form the new current set-point value for the inverter station at this station. Intervention in the current regulator of the intact rectifier station-half is then deferred for the time of signal transmission. Here however a considerable expense for instrumentation is required just for line faults. Otherwise coordinated solutions at the rectifier and inverter stations must be obtained.

In order to avoid rapid, i.e. costly signal lines from the rectifier to the inverter and to enable a fast current rise, a preferred embodiment of the invention provides for a "disturbance-variable feed-forward" to the extinction angle regulation of the inverter triggered by the line protection. This system increases the quenching angle in the intact inverter immediately after triggering of the line protection of a pole. This is analogous to the familiar di/dt-modulation (U.S. Pat. No. 3,801,895) and improves the stability of the inverter. The inverter station, of course, contains a current regulator and an extinction angle regulator, both of which are connected to the control angle regulating device. Simultaneously the voltage at the inverter is decreased and thereby the reserve control of the rectifier increased. The duration of this additional intervention can be limited to the time for the "slow" signal for current set-point increase to go from the rectifier to the inverter (e.g. 20 ms).

It is advisable, further, to adjust the current set-points of the rectifier station-halves a marginally higher amount then the sum of the current set-points of the inverter station-halves, and to prevent consequent decrease of the actual current through current regulation at the inverter station during the brief disturbance induced switching caused by a transitory marginal increase in the current set-points both in the rectifier and in the inverter. By these measures the difference (margin) between the set-points is maintained, while the actual values, however, are equalized.

Further, in a preferred manner, the regulation control function is designed so that during a disturbance, after attainment of the maximum allowable current, the control angle is increased in a known manner (DT-OS No. 2,418,468) in a definite time interval from the immediately preceding operating value steadily upward to a maximum of 60° to 70°. This time interval is dependent on the magnitudes of the reactive impedances in the short circuit (e.g. the generator or network reactance, reactance of the rectifier transformer, filter capacitances and the like) and typically amounts to about 10–25 ms.

This invention has the additional problem of presenting an economical regulating apparatus for implementing the above-mentioned additional functions.

The solution of this problem is to provide switches and connections controlled by the line protection equipment; to assign set-point selector elements to the control angle and current regulators in the control apparatus of each rectifier and/or inverter station-half, to subordinate the control angle regulator to the current regulator, and supply the former with a first control angle set-point prescribed by the latter and then a second set-point derived by selected circuits; and to connect the control apparatus over a signal line with a set-point input to the current regulator of the other inverter or rectifier station-half of the same pole.

The control apparatus is now suitably described in more detail. Memories controlled by the line protection equipment are provided for storing the current set-point for the rectifier valves of the station-halves of one station. Also provided is a first adder for adding the current set-points stored before the fault follows. The output of the current regulator, as a first control angle set-point for the subordinated control angle regulator, is supplied by way of a first input of a maximum-selection element to the control device for the corresponding station-half, while there is connected to the second input of the maximum-selection element a function generator for formation of the second control angle set-point from the difference of the sums of the stored current set-points and the actual current. The first current set-point input or the output of the first adder of the station-half can be connected by way of a first controllable switch and a minimum-selection element to a comparator for comparison with the actual current. Also, a maximum current set-point is applied to a second input of the minimum-selection element, whereby the exceeding of the maximum current set-point by the sum of the stored current set-points trips the subordinate control angle regulator. The output of the minimum-selection element is connected to the set-point input of the control device and thereby with the current regulator of the other station-half of the same pole.

Following the first adder is a first tie point to which, along with the fixed contact of the first controllable switch, there is connected a second adder for forming the difference or control error. The output of the second adder is connected at a second tie point to the control input of a second controllable switch by way of a threshold element, which uses the marginal current as its threshold, and also to the working path of the second controllable switch by way of a third adder with an additional current input and the function generator. There is provided a third switch controlled by the line protection equipment and located between the second controllable switch and the second input of the maximum-selection element.

Between the second memory for the current set-point of the disturbed station-half of the same station and the first adder there is a first timing circuit controllable by the line protection equipment.

A second timing circuit controllable by the line protection equipment is provided for supplying the time varying maximum-current set-point.

With the above described apparatus the initial state of the functioning pole is again reached in a relatively short time, and normal operation can then be resumed, i.e. the current set-point is supplied from the output of the normal power regulation of the pole rather than from the memory.

A quite useful additional measure is to compensate for the reduction in actual current caused by the marginal current method when transferring the current regulation to the inverter station, by having a fourth adder between the second timing circuit and the maximum-selection element. A fourth switch, controllable from one of the inverter station-halves of the same pole, is connected to the marginal current set-point generator, and enables the application of a marginal current set-point to the maximum selection element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
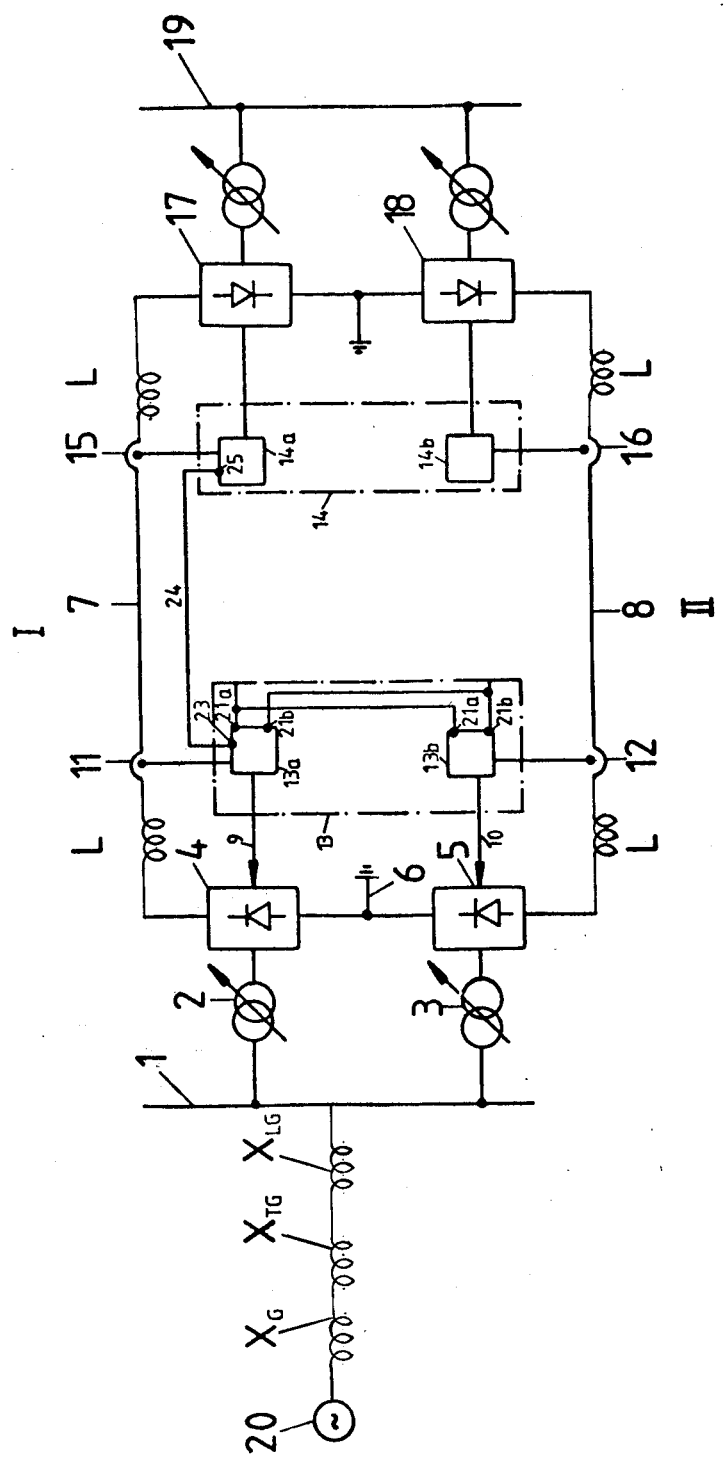
FIG. 1 is a schematic circuit representation of an HDT system with the control device connections.

Referring now to the drawings, wherein like reference numerals designate identical or corresponding parts throughout the several view, and more particularly to FIG. 1 thereof, a current generator 20 is connected to a current bus 1. Although for the sake of simplicity only a single-phase A.C. network is shown in FIG. 1, a three-phase network is normally used. Indicated between generator 20 and bus 1 are the subtransient generator reactance $X_G$, the unit-connected transformer reactance $X_{TG}$ and the reactance of the transmission line $X_{LG}$, which together with the bridge transformer reactance $X_{TB}$ (not shown) of adjustable bridge transformers 2, 3 between the bus 1 and the rectifier bridges 4, 5 cause a voltage rise on the bus 1 in case of a disturbance, e.g. a load drop.

The rectifier bridges 4, 5 form with suitable auxiliary equipment the two station-halves of the rectifier station, each associated with a D.C. conductor 7 or 8 and with smoothing chokes L and a common ground 6. The power passing through the rectifier bridges 4, 5 is regulated to a predetermined level as it proceeds via conductors 9, 10, the control unit 13 and the measuring elements 11, 12 into the D.C. transmission lines 7, 8. In normal operation both station halves, i.e. both rectifier bridges 4, 5 supply about equal amounts of the transmitted power reaching the inverters 17, 18 and the bus 19 at the opposite station and the A.C. or three-phase network thereafter. The power delivered is held there to a predetermined set-point by means of the control unit 14 and the associated metering elements 15, 16, the set-point being matched to that at the rectifier bridges 4, 5. The control units 13 and 14 can be excited by line protection devices, e.g. the surge protector, the longitudinal differential protector, the D.C. voltage dependent current set-point reduction etc.

Instead of a single bridge for each station-half of the HDT system, several bridges can be utilized.

In case of a fault, several attempts are usually made to restore the disturbed pole to service. In DT-OS No. 2,418,468, FIG. 2b, a successful attempt of this sort is illustrated with the help of the time curves of the electrical variables. It is hoped, here, that the D.C. voltage also again climbs. However, when the attempts fail, the control interventions of this invention are to be preferred.

Figure 2:
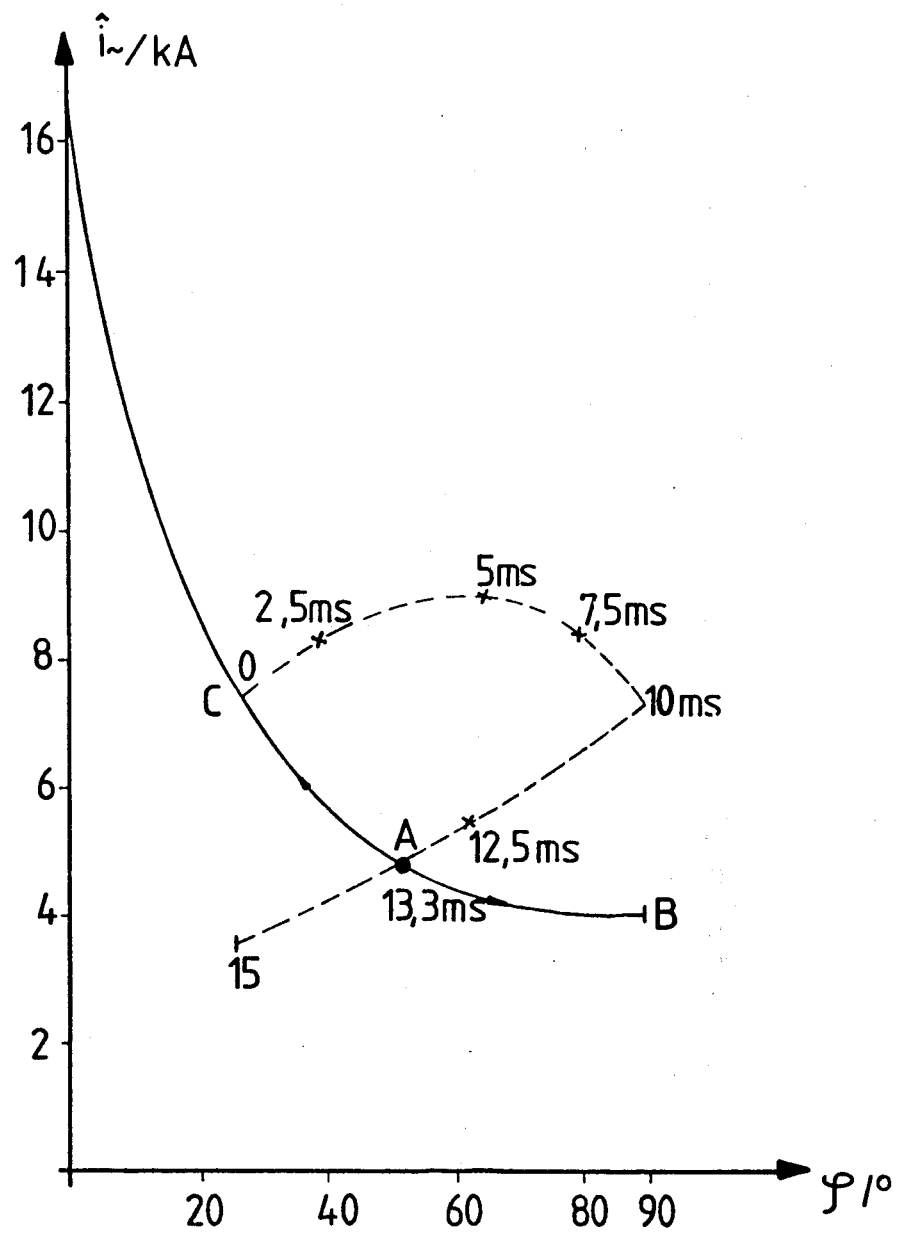
FIG. 2 is a graph of the A.C. current in the secondary of the rectifier transformer of the HDT system as a function of phase angle.
Figure 4:
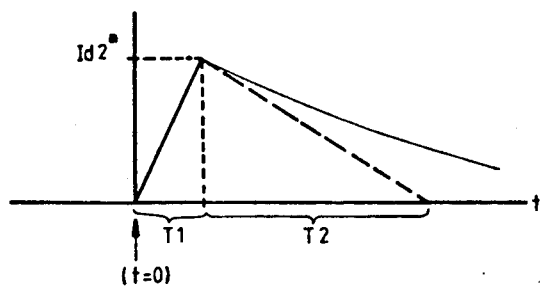
FIG. 4 is a graph of the current-time function of a first timing circuit.

FIG. 2 shows, with the help of the example given in DT-OS No. 2,418,468, FIG. 4, drawn dashed, how the A.C. current i varies with a 50% load drop when there is no intervention in the control of the intact rectifier station-half. (The numbers denote the times from the start of the disturbance, i.e. after the initiation of the load drop in the disturbed station-half). After passing through the point A (i.e. about 13.3 ms after the start of the load drop), at which the two curves intersect, the bus voltage U becomes greater than the nominal value $U_N$. In order to prevent this, there are two parameters which can be adjusted, the control angle or the D.C. current of the intact rectifier station-half, as is to be inferred from FIG. 2.

First the control angle of the intact rectifier station-half can be made smaller so as to double the D.C. current (FIG. 2, along the curve from A to C). This is feasible if the valves are not overloaded by the resulting high current.

The second possibility is to increase the control angle $\alpha$ of the intact rectifier station-half (FIG. 2, along the curve from A to B).

The second possibility is developed and followed within the framework of the method of the invention.

Figure 3:
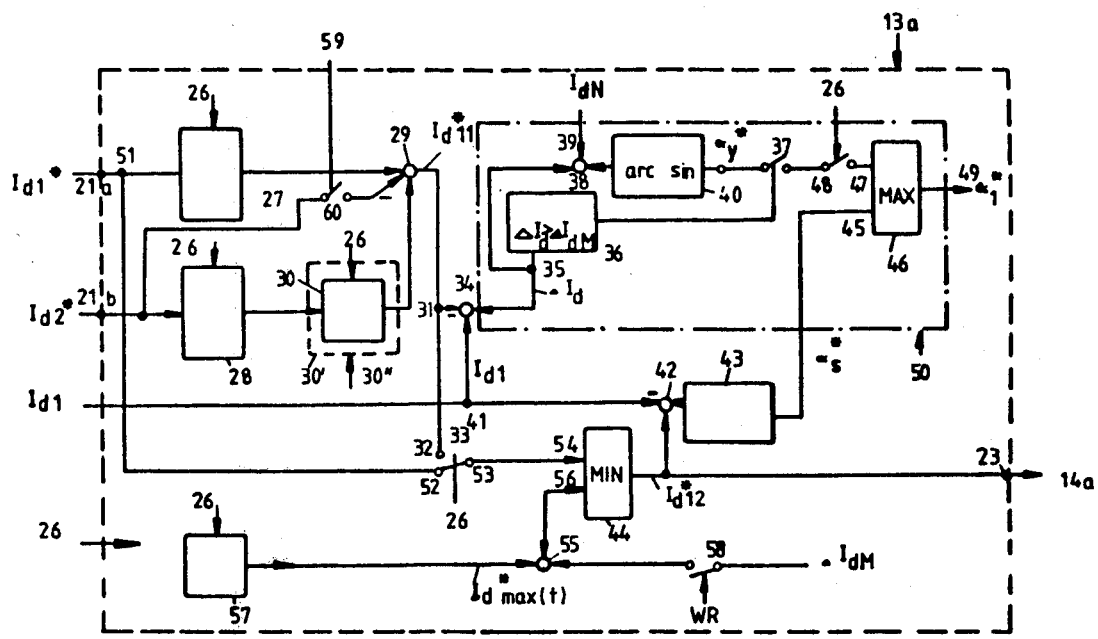
FIG. 3 is a schematic circuit representation of a control device of a rectifier station-half.

In the following description it is assumed for greater case in understanding that the rectifier station is current regulating in normal operation, and that the rectifier station forms a current set-point for the inverter station in case of a disturbance and transfers the current regulation to it in a short time, i.e. the rectifier station is adjusted mainly with auxiliary devices as in FIG. 3. It has already been noted above that a corresponding outfitting and functioning of the inverter station and/or a direct increase in the quenching angle in the intact inverter is also possible. Further, it is assumed by way of example that a fault occurs in the lower (II) of the two poles I and II.

For this case the control units 13 and 14 are shown in greater detail in FIG. 1. Each unit 13 or 14 consists of two control devices 13a and 13b or 14a and 14b.

The set-point inputs 21a and 21b to the control devices 13a and 13b are connected together. An output 23 of the control device 13a is connected via a signal line 24 with an input 25 to the control device 14a (internal to the current regulator - not shown) of the inverter station-half 17 belonging to the same pole I. The same holds for the control devices 13b and 14b (not shown). A circuit protector device 26 is connected to both control devices 13a, 13b on the rectifier side.

The construction of the control device 13a will be explained with the help of FIG. 3.

Two memories 27 and 28 are provided for storing the pre-disturbance current set-points $I_{d1}*$, $I_{d2}*$ for the rectifier halves 4, 5. They may naturally also be located outside the control device 13a (dashed) and can be common to both control devices 13a and 13b. Following the first memory 27 is a first adder circuit or summing point 29 (called "adder" for short). Following the second adder 28 is a timing circuit 30 connected appropriately to an integrator 30' and characterized by an integrating-delaying-time behavior. Timing circuit 30 is connected at its output to the first summing point 29. Following the adder 29 is a first tie-point 31 to which is connected a fixed contact 32 of a first switch 33 controllable by the line protection equipment, and a second adder 34. Following the second adder 34 in a second tie-point 35 to which is connected the control input of a second controllable switch 37 by way of a threshold element 36 which has the marginal current $I_{dM}$ as its threshold. Also connected to the tie point 35 is the working path of the second controllable switch 37. Switch 37 is connected to tie point 35 by way of a function generator 40 and by way of a third adder 38 which has an auxiliary input 39 for the auxiliary variable $I_{dN}$.

The actual current value $I_{d1}$ is connected to the second adder 34 in the negative sense. For this purpose there is a third tie-point 41 ahead of the set-point vs. actual valve comparison point 42 of a current regulator 43. To the comparison point 42 there is also connected the output $I_{d12}*$ of a minimum-selection element 44. The output variable $I_{d12}*$ serves as the set-point for the control device 14a (FIG. 1).

The output of the current regulator 43 is connected to a first input 45 of a maximum-selection element 46. To the second input 47 of maximum-selection 46 is connected a third switch 48 controlled by the line protection device 26, Third switch 48 follows the controllable switch 37.

The output 49 of the control angle regulator 50 (dash-dotted) is connected to a standard firing pulse generator (not shown).

Ahead of the first memory 27 is a fourth tie-point 51 which is connected to a second fixed contact 52 of the first controllable switch 33. The movable contact of switch 33 is tied to a first input 54 of the minimum-selection element 44. The output of a fourth adder 55 is tied to a second input 56 of the minimum-selection element 44. The fourth adder 55 receives its inputs from a second timing circuit 57 and, by way of a fourth switch 58 operated by the control device 14a of the inverter, from a marginal current generator (not shown). By means of a signal 59 developed when restoring the disturbed pole to service, the momentary current set-point $I_{d2}$ is supplied with a negative sign to the first adder 29 through a switch 60.

The manner of operation of the switching arrangement is explained below with the help of two examples. After HDT load drop, holding voltage constant is given priority over maintaining true power transmission (Example 1):

The design and procedure are such that, after a line fault on the D.C. side, the regulation of the remaining HDT in the limiting case is devoted to holding the voltage constant at the expense of the true power transmission. Such is conceivable, e.g., in the case of inverter-feeding of smaller-wire isolated systems, where there is no stability problem and frequency deviations can momentarily be tolerated, but where significant network transient overvoltages are to be feared because the high circuit impedance prevalent upon reactive power drop.

In normal operation the HDT, a bipole in the example, works with current regulation on the rectifier side (control devices 13a and 13b ) and voltage regulation (or to be more exact, extinction angle regulation) on the inverter side (control devices 14a and 14b). The voltage regulation operates as fixed set-point control so that the current regulation can be viewed as power regulation. The current set-points $I_{d1}*$ and $I_{d2}*$ under rated operating conditions are exactly proportional to the true power and approximately proportional to the rectifier reactive power. This relationship can be utilized in case of a load drop in one of the two poles (I or II) to control the remaining pole (II or I) temporarily in order to compensate for the momentary reactive power deficit. Also, up until the attainment of maximum current $I_{dmax}$, there is the desirable side effect of simultaneous compensation of the true power deficit.

If the maximum current is reached then only the requirement to maintain constant voltage can still be satisfied. This is done by increasing the control angle in the rectifier while simultaneously regulating the current in the inverter at maximum current. As a result, the rectifier reactive power is increased but the true power transmitted is decreased. The relationship between control angle and rectifier reactive power Q is approximately $$Q \approx I_{dmax} \sin \alpha.$$

In order to increase the reactive power in accordance with this relationship, the arcsine function generator 40 is provided for forming the set-point $\alpha^*$ after formation of the current set-point $I_{d11}^*$ from the sum of the set-points $I_{d1}^*$ and $I_{d2}^*$. The construction of such a function generator is known (Steinbuch, "Taschenbuch der Nachrichtenverarbeitung" 2nd edition (1967), Springer-Verlag, Berlin/Heidelberg, New York, pp. 1155, 1176). An arscine function generator 40 can also be easily designed and fabricated since arccosine function generators for linearizing the control loops of normal line-driven rectifiers are common and generally well known. Thus by subtraction of an angle $\alpha_z = 90°$ from the control angle $\alpha$, the desired output quantity arcsin $\alpha$ can readily be formed.

This is required, of course, only when a large control range is provided for $\alpha$. For smaller variations the approximate relationship $$Q \approx I_{dmax} \cdot \alpha$$

holds. In such cases a correspondingly simpler function generator 40 is sufficient.

The connections in the control devices necessary for the intervention in the regulation will be explained with the help of FIG. 3. It is assumed as for FIG. 1 that a line fault leads to a load drop in pole II. A current set-point change in pole I is triggered by the disturbance signal from the line protection device 26. Thereupon, at the moment of the fault, the current set-points $I_{d1}^*$ and $I_{d2}^*$ in the control device 13a are stored in the memories 27 and 28. The stored set-point $I_{d2}^*$ is applied to the input of the first timing circuit 30 the output of which is connected to an adder 29 for current set-point formation. The set-point $I_{d11}$ formed here is sent, during the intervention, through a limiting circuit, described below, in place of the pre-fault set-point $I_{d1}^*$ of the current regulator 43.

The influence of the reactive power balance during restarting of the disturbed pole is taken into account as follows. During restart, the clear signal 59 closes the switch 60. The current set-point $I_{d2}^*$ then passes through the switch 60 and is deleted from the sum of the stored current set-points formed at the summing point 29. Upon successful restart the signal 26 switches the system to normal operation.

The first timing circuit 30 raises the current set-point in the intact undisturbed station-half by $I_{d2}^*$ after load drop in the other pole II only so fast that strong unbalancing of rectifier operation is avoided. This can be effected by inserting an integrator 30' which integrates up to the input value in an adjustable time $T_1$ (e.g. $T_1 = 10$ ms). The input to the integrator 30' is then reset to zero (input 30'') and the feedback so connected that the output of the integrator 30' falls back to zero exponentially with the time constant $T_2$ (FIG. 4). The time constant $T_2$ is to be chosen so that the network regulation can follow the resulting reactive and true power variation (e.g. $T_2 = 10$s).

Figure 5:
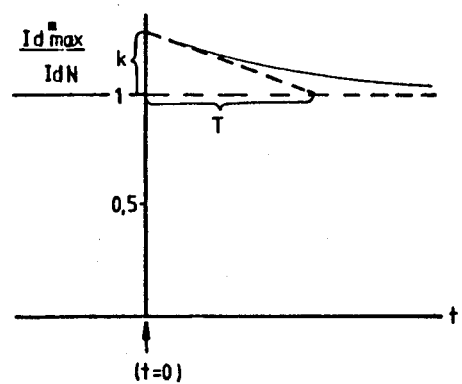
FIG. 5 is a graph of the current-time function of a second timing circuit.

The governing set-point $I_{d12}^*$ for the current regulator 43 is determined with the maximum-current set-point $I_{dmax}^*$ in mind (minimum selection). To make use of the short-time overload capability of the rectifier valves, this maximum-current set-point $I_{dmax}^*$ can be time dependent. In the illustrated example, the disturbance signal starts the generation of $I_{dmax}^*$ (t) by the second timing circuit 57 which exhibits a proportional-differentiating-simple delaying (PD-$T_{(1)}$) behavior, where the time constant $T_{(1)}$, for example, can have the value $T_{(1)} = 4$s and the maximum increase K over the permissible steady current can be $K = 0.25$ (FIG. 5). This timing circuit 57 thus permits a high current value as long as the valves of the rectifier constructed from power thyristors are still cold and a low value afterward.

The current set-point $I_{d12}^*$ is also transmitted to the inverter via the signal line 24 between rectifier and inverter, i.e. to the control device 14a and the corresponding current regulator. As soon as the rectifier reaches its limit of adjustment (with $\alpha = \alpha \min$) the inverter takes over the current regulation, in a known manner, in accordance with the marginal-current method (CH-PS No. 422 144, GB-PS No. 1,043,085). Here the control angle at the inverter station-half is increased, contributing to increased reactive power.

In order to compensate the decreased current set-point in the inverter produced by the marginal-current method a "marginal-current compensation" can be applied by which, when triggered by the changeover to current regulation in the inverter, the current set-points in both the rectifier *and* inverter are temporarily increased by the marginal current $\Delta I_{dM}$.

A maximum-current set-point increased by the marginal current $\Delta I_{dM}$ must then be permitted in the rectifier or in the control device 13a. However this leads to no correspondingly higher actual current, as long as the inverter station-half regulates the current.

As soon as the maximum current is reached, the reactive power can be increased only by increasing the control angle. In order to interfere as little as possible in the "natural" regulation action of the rectifier and the inverter, the control angle increase is performed on the rectifier side. To accomplish this the difference $\Delta I_d$ between the current set-point $I_{d11}^*$ and the actual current $I_{d1}$ is formed by the second adder 34.

As soon as the difference $\Delta I_d$ is greater than the marginal current $\Delta I_{dM}$ for a rather long time (e.g. 20 ms), the demanded current $I_{d11}^*$ is surely higher than the permissible maximum current $I_{dmax}$. This condition initiates the intervention in the subordinate control angle regulation.

In that event the control error $\Delta I_d$ is fed to an arcsine or a proportional element function generator 40. The input to this element receives such an auxiliary quantity $I_{dN}$ that the output supplies a control angle set-point $\alpha_a^* = \alpha_N$ when the control error $\Delta I_d = 0$. If the control angle set-point $\alpha_a^*$ is greater than the control angle set-point $\alpha_s^*$ at the output of the current regulator 43, then this is effective for the subordinate control angle regulation (maximum selection).

With the described arrangement the operable pole I is restored to its initial condition after about 3 $T_2 = 30$s, i.e.

the rectifier station-half regulating the current according to the stored current set-point $I_{d1}$* and the inverter station-half regulating the extinction angle. Thereupon normal operation can be resumed, i.e. with the current set-point for the rectifier supplied not from the memory but from the output of the power regulation of the pole.

The direct set-point $I_{d1}$* can be used to form the current set-point $I_{d11}$*, i.e. storage of a current set-point can be dispensed with if the last-described intervention in the control angle regulation is not a required operation. This of course considerably diminishes the range of adjustment for holding voltage constant.

The control angle source can also be a function generator having a memory which contains, for example, 50 $\alpha$-values (which $\alpha_{max}=60°$ to $70°$), each $\alpha$ value having a corresponding time value, and with a definite spacing between the time values. Intermediate values can be interpolated linearly or by means of 2nd or 3rd degree polynomials.

Extension to genuine voltage regulation after HDT load drops and other disturbances (Example 2):

The above described method for elimination of network-frequency over-voltages after HDT load drop requires in addition to memories, switching devices and timing circuits, only conventional HDT equipment. As a pure voltage control, it cannot address other occurances in the network. It is limited to cases of disturbance.

The method can be extended to true voltage regulation if this is required. The additional outlay is essentially for a standard device for percise measurement of the amplitude of the network voltage which is to be limited. The advantage of this method is that it is suitable for eliminating a network-frequency overvoltage regardless of its origin.

With such voltage regulation, storage of the current set-point is not meaningful. Rather, the true power set-point of the failed pole is stored in the intact pole and subsequently processed by a timing circuit as in FIG. 7, so that the true power compensation does not overloading of the intact pole, but is maintained only long enough for the network regulation to follow. Attempts to restart the faulty pole could then, as in Example 1, be based on subtraction of the true power set-point, predetermined for restart, from the sum set-point of the true power of the intact pole.

It is to be emphasized with respect to voltage regulation of this type that it only intervenes in exceptional circumstances, namely when network-frequency over-voltages occur, and then only for a limited time, from which one assumes that it suffices to reduce the network voltage rise with the normal voltage regulation of the network or the stepping switch regulation of the HDT. The true power transmission can be considered during this time only within the bounds of the power capability of the HDT. The mentioned limited time can be determined empirically, for example.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a method for controlling the true and reactive power behavior of a high-voltage D.C. transmission (HDT) system having a rectifier station connected to a first three-phase network and an inverter station connected to a second three-phase network and to said rectifier station over a positive D.C. transmission line and a negative D.C. transmission line, each of said stations divided into two halves, said station-halves of each of said stations connected in common to ground or to a return wire, said station-half of each station connected together over said positive D.C. transmission line forming a positive pole, said station-halves connected over said negative D.C. transmission line forming a negative pole, each station equipped with current and voltage regulators as well as control angle and extinction angle regulators, each of said poles having protective devices to detect transmission disturbances caused by a system fault, whereby in the event of a tripping of one of said protective devices of a disturbed pole and a subsequent load drop in said disturbed pole there occurs an intervention of short duration in the regulation of the other intact pole, said intervention compensating for network transients and overvoltages resulting from said load drop by increasing the current set-point of said current regulator of the other intact station-half according to a preset function and by increasing the control angle set-point for the control angle regulator of the one intact station-half of said intact pole according to a preset function, the improvement comprising the steps of:

forming a new current set-point by storing in memories the pre-fault current set-points of both of said rectifier station halves, comparing said stored current set point with a predetermined maximum-current value, attaining a control angle limit ($\alpha_{min}$) in said rectifier station of said intact station-half, transferring control of said current regulation of said intact pole from said rectifier station to said inverter station of said intact pole after said control angle limit ($\alpha_{min}$) is attained, and subsequently increasing said control angle of the one intact station-half.

2. In the method according to claim 1, the improvement further comprising:

raising temporarily said current set-points in both said rectifier station-half and said inverter station-half by the amount of a marginal current during current regulation at said intact inverter station-half, thereby avoiding a decrease in the actual current of said pole upon said transfer of said current regulation to said inverter station.

3. In a method according to claim 1, the improvement further comprising:

increasing the extinction angle in said intact inverter station immediately after said tripping of said transmission line protective device.

4. In a method according to claim 1, the improvement further comprising:

subtracting said current set-point at the disturbed pole during attempts to restart said disturbed pole from the sum of said stored current set-points in said intact pole, and controlling said substraction by means of a restart signal.

5. In a regulating apparatus for controlling the true and reactive power behavior of a high voltage D.C. transmission (HDT) system having a rectifier station connected to a first three-phase network and a inverter station connected to a second three-phase network, said rectifier and inverter stations having positive and negative station-halves respectively connected to each other over positive and negative transmission lines to form positive and negative poles, each station having a common ground or return wire and equipped with current and voltage regulators as well as control angle and extinction angle regulators, each of said poles having line protective devices to detect a transmission line disturbance caused by a system-fault, whereby in the event of a tripping of one of said protective devices of a disturbed pole and subsequent load drop in said disturbed pole there occurs an intervention of short duration in the regulation of the other intact pole, said intervention compensating for network transients and overvoltages resulting from said load drop, the improvement comprising:

regulating control means for controlling the true and reactive power behavior of said HDT system, said control means located in each of said rectifier and said inverter station-halfs, said regulation control means comprising switching means actuated by said line protective devices for initiating the formation of new current set-points in response to said line disturbance; memory means coupled to said switching means for forming in said intact station-half a new current set point derived from the currents existing in said positive and negative poles prior to said line disturbance, current regulation means coupled to said memory means for selecting current set-points; control angle regulation means coupled to said memory means and said current regulation means for selecting a control angle set-point in accordance with said current set-point selected by said current regulation means, said control angle regulation means thereby subordinated to said current regulation means, and signal transmission line means for connecting said regulation control means of said rectifier and said inverter station-halfs of the same pole, said signal transmission means transmitting a current set-point from one station half to the other station-half of the same pole.

6. In a regulating apparatus for controlling the true and reactive power behavior of a high voltage D.C. transmission (HDT) system having a rectifier station connected to a first three-phase network and a inverter station connected to a second three-phase network, said rectifier and inverter stations having positive and negative station-halves respectively connected to each other over positive and negative transmission lines to form positive and negative poles, each station having a common ground or return wire and equipped with current and voltage regulators as well as control angle and extinction angle regulators, each of said poles having line protective devices to detect a transmission line disturbance caused by a system-fault, whereby in the event of a tripping of one of said protective devices of a disturbed pole and subsequent load drop in said disturbed pole there occurs an intervention of short duration in the regulation of the other intact pole, said intervention compensating for network transients and overvoltages resulting from said load drop, the improvement comprising:

regulation control means for controlling the true and reactive power behavior of said HDT system, said control means located in each of said rectifier and said inverter station-halfs, said regulation control means comprising switching means actuated by said line protective devices for initiating the formation of new current set-points in response to said line disturbances, memory means coupled to said switching means for forming in said intact station-half a new current set-point derived from the currents existing in said positive and negative poles prior to said line disturbance, current regulation means coupled to said memory means for selecting current set-points, control angle regulation means coupled to said memory means and said current regulation means for selecting a control angle set-point in accordance with said current set-point selected by said current regulation means, said control angle regulation means thereby subordinated to said current regulation means;

signal transmission line means for connecting said regulation control means of said rectifier and said inverter station-halfs of the same pole, said signal transmission means transmitting a current set-point from one station half to the other station-half of the same pole;

said memory means comprising first and second memory means for storing the pre-disturbance current set-points of both station-halves of said station, and first adder means coupled to said first and second memory means for forming the sum of said-pre-disturbance current set-points;

said switching means comprising first switching means coupled to said first adder means and said current set point of said intact station-half, said first switching means having an output connected to said sum of said pre-disturbance current points after said disturbance, said output otherwise connected to said pre-disturbance current set-point of said intact station-half;

said current regulation means comprising minimum current set-point selection means, coupled to said output of said first switching means, for forming said current set-point transmitted over said signal transmission means by selecting between said sum of said pre-disturbance current set-points and a predetermined time-varying maximum current set-point the lesser thereof, and for activating said subordinate control angle regulation when said sum of said pre-disturbance set-point exceeds said predetermined maximum current set-point signal; and current set-point comparison means, coupled to said minimum selection current set-point means, for generating a first control angle set-point in accordance with the difference between said current set-point signal formed by said minimum current set-point selection means and the actual current of said intact pole; and said control angle regulation means comprising function generator means coupled to said first adder means, for forming a second control angle set-point in accordance with the difference between said sum of said predisturbance current set-point and said actual current; and maximum control angle set-point selection means, coupled to said function generator means and said current regulation means, for forming a regulating control angle set-point by selecting between said first and second control angle set-points the larger thereof.

7. In a regulating apparatus according to claim 6, the improvement further comprising:

said memory means further comprising second adder means, coupled to said first adder means, for forming a control error signal by subtracting said sum of said pre-disturbance current set-points from said actual current; and said control angle regulation means further comprising threshold detection means, coupled to said second adder, for generating a control angle switch activating signal when said control error signal formed by said second adder means exceeds a predetermined marginal threshold level; third adder means, coupled to said second adder means, for adding to said control error signal an additional auxiliary current value, said third adder means having an output which is applied to said function generator means for forming said second control angle set-point; second switching means, coupled to said function generator and said threshold detection means, for passing said second control angle set-point when said predetermined marginal threshold level is exceeded by said control error signal formed by said second adder means; and third switching means, coupled to said line protective devices and said second switching means for passing said control error signal to said maximum control angle set-point selection means.

8. In a regulating apparatus according to claim 7 the improvement of said memory means further comprising:

first timing means coupled to the output of said second memory means for delaying the passage of said pre-disturbance current set-point of said other station-half, said first timing means activated by said line protective devices.

9. In a regulating apparatus according to claim 8, the improvement of said memory means further comprising:

resettable integrating means, coupling said second memory means to said first timing means, for controlling the rate of increase of said pre-disturbance current set-point at the output of said second memory means.

10. In a regulating apparatus according to claim 6 the improvement of said current regulating means further comprising:

second timing means controllable by said line protective devices for generating said predetermined time-varying maximum current set-point.

11. In a regulating apparatus according to claim 10, the improvement of said current regulation means further comprising:

fourth adder means, coupled to said second timing means, for adding to said time varying maximum current set-point a predetermined marginal current set-point; and fourth switching means controlled by regulation control means for the other intact station-half for connecting said marginal current set-point to said fourth adder means.

12. In a regulating apparatus according to claim 6, the improvement of said function generator means of said control angle regulating means further comprising:

said function generator means having an arc-sine function characteristic.

13. In a regulating apparatus according to claim 6, the improvement of said memory means further comprising:

fifth switching means, coupled to said pre-disturbance set-point of said other station-half and controlled by a restart signal, for connecting said pre-disturbance current set-point of said other station-half to said first adder with a negative sign, whereby said pre-disturbance current set-point of said other station-half is subtracted from the sum at the output of said first adder means during an attempt to restart said HDT system.

* * * * *